United States Patent [19]

Taintor

[11] 4,088,044
[45] May 9, 1978

[54] MANUALLY CONTROLLED SEMI-AUTOMATIC STEP GEAR TRANSMISSION

[76] Inventor: Oliver E. Taintor, 7 Lynack Rd., Hawthorne, N.J. 07506

[21] Appl. No.: 766,162

[22] Filed: Feb. 7, 1977

Related U.S. Application Data

[62] Division of Ser. No. 642,812, Dec. 24, 1975.

[51] Int. Cl.² .............................................. F16H 57/10
[52] U.S. Cl. ..................................................... 74/765
[58] Field of Search .......................... 74/765, 789, 753

[56] References Cited

U.S. PATENT DOCUMENTS

| | | | |
|---|---|---|---|
| 3,033,333 | 5/1962 | Breting et al. | 74/765 X |
| 3,313,179 | 4/1967 | Flinn | 74/765 X |

FOREIGN PATENT DOCUMENTS

| | | | |
|---|---|---|---|
| 924,061 | 4/1963 | United Kingdom | 74/765 |

*Primary Examiner*—Samuel Scott
*Assistant Examiner*—Frank H. McKenzie, Jr.
*Attorney, Agent, or Firm*—James J. Cannon, Jr.; James J. Cannon

[57] ABSTRACT

A manually controlled semi-automatic, multiple-step, internal gear driven transmission characterized by a hydraulic activation system of compensating fluid pressure versus spring compression resistance forces including a forward section having an integrated dual clutch and pinion carrier, driven by an engine shaft, a gear-type oil pump driven by helical gears supplying the servo-system, a rear section pinion carrier, related die cast pinion gear clusters, annulus gears and an interconnecting middle section dual-annulus gear. The gear ratio changes are effected by annulus fluid-combination spring power cylinder brake control and fluid actuated clutches capable of causing the transmission of torque to a load shaft directly through a main shaft, through the rear pinion carrier or through the dual annulus, whereby the least reduction is obtained when all elements are in operation. The invention is further characterized by a variable pressure regulator, governing actuating fluid pressure at idling speeds, and a differential-piston pressure regulator, governing main line fluid pressure at all speeds, to a directory rotary distributor valve feeding said power cylinders and clutches as directed by a manual straight line shifting arrangement, said regulators having a compensating fluid pressure versus spring compression design.

15 Claims, 14 Drawing Figures

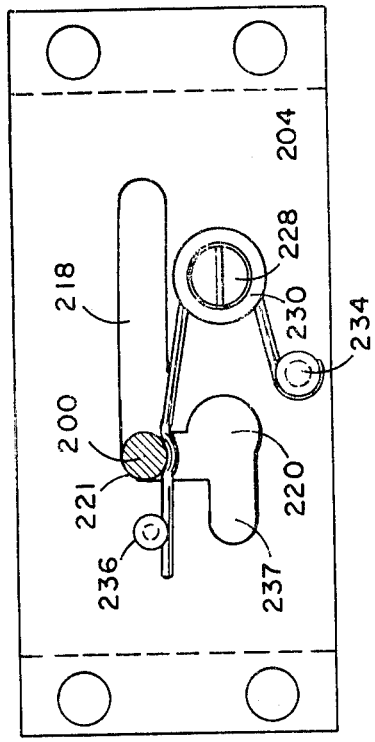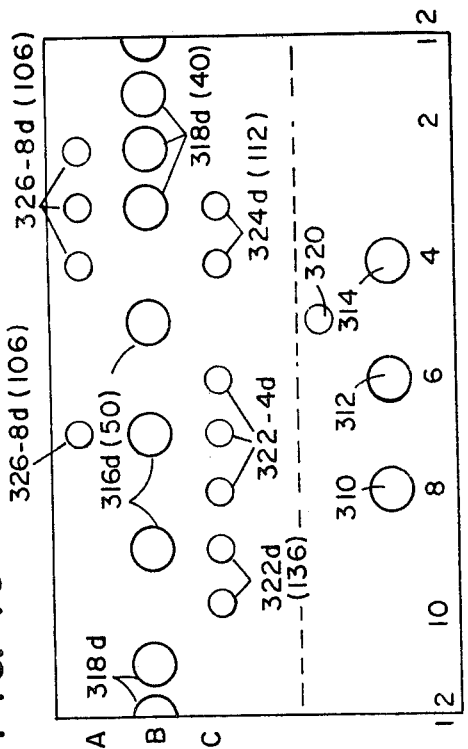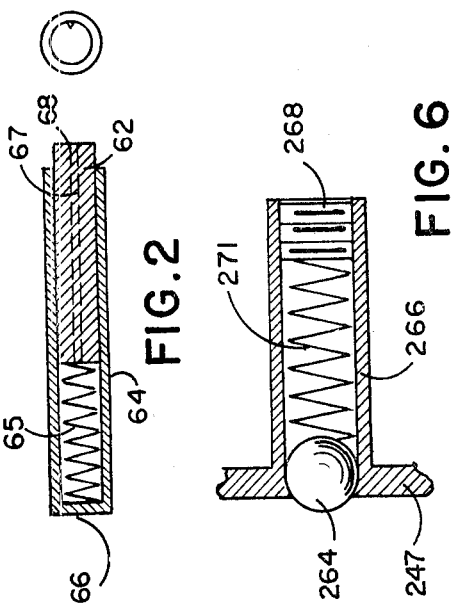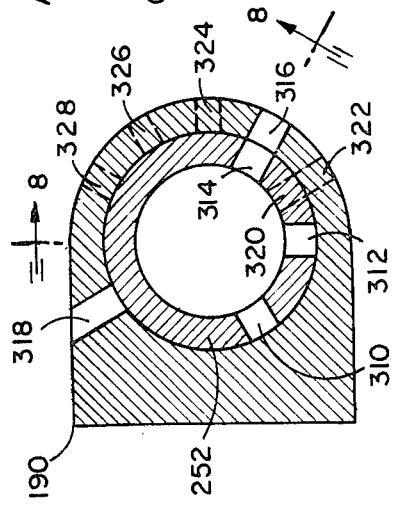

MANUALLY CONTROLLED SEMI-AUTOMATIC STEP GEAR TRANSMISSION

This is a division of application Ser. No. 642,812, filed Dec. 24, 1975.

BACKGROUND OF THE INVENTION

The present invention relates to power transmissions and in particular to those which are semi-automatic in nature and have epicylic planetary gear trains in combination with hydraulically activated power cylinder and clutch gearing controls as directed through a rotary distribution valve by means of straight line shifting control. The invention relates to combinations of achieving smooth gearing transitions through regulation, at idling speeds and at operating speeds, through a system of compensating fluid pressure versus spring compression resistance valves sensitive to main line pressure respectively. The invention further relates to an exclusive interconnected internal gear drive arrangement, of engine torque transference to a load shaft, through plural power paths, which employs a majority of die cast pinion gears.

DESCRIPTION OF THE PRIOR ART

The present invention relates to semi-automatic multiple step-ratio transmissions and particularly to one which is controlled manually through a straight line shifting arrangement but without the necessity of having to utilize a foot clutch pedal. A unique system of two sets of epicyclic gears, having internal gear drive, is used negating the need of conventional spur-gear tooth action at any point in the power train. Due to a unique fluid pressure versus spring compression activated hydraulic servo-system, which relieves stress upon the engine and internal elements, lower gear tooth pressures result making feasible the use of die cast gears in this arrangement of exclusive internal gear drive, which would allow a marked reduction in manufacturing costs over the prior art. The epicyclic gearing interacts with and transfers torque from a variable speed prime mover or engine shaft to a variable speed load shaft interconnected with the driving means. In contrast to the prior art, wherein the greatest reduction is obtained when both sets of gears are in operation, in the present invention, the least reduction occurs when both sets of planetary gears are in operation.

The primary purpose of a transmission is to maximize torque for any given engine speed and transmit the same to the elements which directly drive the vehicle as efficiently as possible. Since it has become increasingly necessary to conserve resources, especially energy fuels, it is desired that a transmission be an integral part of achieving economy. To achieve greatest efficiency and reliability one would use a standard manual clutch operated gearbox system as evidenced by the sub-compact cars being manufactured today. The majority of vehicle owners, however, are concerned only with a means of transport and its ease of operation which, in effect spurred the development of fully automatic transmissions. Automatic transmissions yield convenience but generally they are bulky and very complicated in total operation, not readily adaptable to the smaller "compact" vehicles and more expensive; thus the characteristics of the automatic transmission are not compatible with the economy aspects of the smaller cars due to a great divergence of efficiency when compared with a standard transmission.

As a result the present invention has combined advantages of both systems by producing a transmission of minimal size which is economical to build and to operate, is efficient and is not difficult or inconvenient to operate. Maintenance of the transmission is not difficult as compared to other transmissions, and furthermore it employs a gear system, although somewhat altered, that has been proven to be highly reliable. In fact it was noted in *Modern Transmission Systems,* Volume 5, 1962, Arthur W. Judge at page 16, that a transmission of the type herein disclosed would be most desirable if a satisfactorily integrated hydraulic system, pump and motor combination could be found, thus reducing the complexity and prior inefficiency of such systems which have been common to the art. The unique arrangement and composition of the hydraulic servo-system of the present invention reduces the number of individual components necessary to operate the system due to the elimination of a number of components utilized to activate prior art systems such as electrical connections and auxilary solenoids.

The prior art means of controlling and operating the servo-system of a semi-automatic transmission have been by electrical, pneumatic, or by hydraulic means. These units are placed in operation, as is the present invention, by manual operation of a gear lever or switch. These systems have varying degrees of complexity, but we are concerned primarily with the hydraulic systems.

Prior art means of transmission hydraulic servo-system activation generally include the following: The Bendix vacuum which utilizes a servo-cylinder and piston; the Gillette clutch control which makes use of a governor in conjunction with accelerator control, combined with a switching means to quickly disengage the clutch for shifting purposes; the Manumatic system which employs an electrical system for activation; and patents earlier cited.

The present system is most similar to those systems known as fluid coupling transmissions wherein a pump is driven by a variable speed prime mover. This system eliminates the loss of power by slip and provides the vehicle with a smooth acceleration from rest. These systems employ a turbine shaft, fluid friction clutch shoes and a flywheel drum as components.

The present invention employs similar components but is differentiated from the prior art and characterized by elements which form a system of compensating fluid pressure versus spring compression activation means. Rather than use a fluid friction clutch or other prior art hydraulic servo-system or transmission activation means, a variable pressure regulator is employed which is supplied control oil from a submerged gear-type pump driven by helical gears which, in turn, receive driving power directly from the engine. The variable pressure regulator, acting upon a principle of compensating fluid pressures and opposing spring compression pressures, at idling speeds, furnishes pressurized lubrication at five to one hundred percent of main line pressure to a rotary distributor valve which supplies oil under pressure to the appropriate brake cylinder and clutch connections, individually or in combination, thus providing the desired sequence of gear changes. Means to assure maintenance of adequate main line pressure, the annulus gear control means, and clutch separators are also designed on the concept of compensating fluid pressure versus spring compression. Thus the combination allows the engine to pick up the load gradually, without shock, yielding greater efficiency with less stress on interrelated component parts, primarily the engine and the gear trains. Furthermore, this feature greatly aids fuel economy and may be easily maintained due to the simplicity of design and the relatively small number of operative component parts and their ready accessability.

The use of epicyclic gearing is common to the art due to the reliability and simplicity of the system. As previously stated, this specific gearing system and arrangement is operated in combinations not found in the prior art to the best of the inventor's knowledge. This arrangement was designed to optimize efficiency and to reduce overall bulk and weight. In contrast to the present invention, many prior art epicyclic gear trains have had problems incorporating reverse gear integrally with the remainder of gearing combinations. Many prior art transmissions even have distinctly separate gearing arrangements for the reverse gear. Reverse, in the present invention, is incorporated in the rear unit of the transmission and is operated through the meshing of the rear planetary gear cluster combination.

The present transmission system, therefore, is an improvement over prior art combinations due to the utilization of a unique hydraulic servo-system in combination with the unique gear train arrangement. Thus the hydraulic servo system creates low stress on internal gearing components by its gradual activation of the same. There is no conventional spur gear tooth action at any point in the power train, and since the transmission uses internal gear drive exclusively, it is feasible to use die cast gears which would effect a marked reduction in manufacturing costs.

Although maximum acceleration may not be obtained, the transmission is conductive to obtain high gas mileage. The transmission is highly efficient and would be readily adapted to the new lines of cars being produced. Other features and advantages of the present invention will become evident throughout the application.

SUMMARY OF THE INVENTION

The present invention relates to a semi-automatic transmission employing a unique combination of epicyclic gearing which is manually controlled in a straight-line shifting arrangement through the incorporation of an uniquely integrated compensating fluid pressure versus spring compression controlled hydraulic servo-system. The epicyclic gearing in combination with a dual clutch arrangement acts to provide efficient torque application from an engine shaft or variable speed prime mover to a driven load shaft. To further distinguish this gearing system, it should be noted that the least reduction prevails when the majority of gears are engaged, that is, in third gear, being below direct drive, in the four speed transmission of the present invention.

The invention is characterized by several improvements over prior art concepts. The hydraulic servo-system has an helical gear driven submerged gear-type oil pump, which receives driving power from a forward pinion carrier, to provide main line pressure lubrication to all vital parts of the transmission. The rotary distributor valve, directing activation of the power cylinder gearing control means and clutches, is rack and pinion driven and linked to the shift lever. These elements allow a straight line shifting arrangement with the operator easily selecting the appropriate gear, without the aid of a manual clutch, for smooth and efficient activation and operation of the transmission. Thus, through this arrangement, the entire hydraulic servo-system is simplified.

The hydraulic servo-system, being integrated into the forward portion of the transmission, is constructed so that power is transmitted from the main engine shaft through a forward pinion carrier to the two helical drive gears of the transmission oil pump which, in turn, acts to supply control oil to the variable pressure regulator which, in turn, activates the entire transmission hydraulic system. The regulator primarily acts to allow the hydraulic servo-system and gearing combinations to be activated at an idling speed gradually, without shock, on a "creeping" basis. When the engine speed is increased to a "fast idle", regulated oil pressure increases gradually to main line pressure and the transmission is solidly in the gear of the driver's choice. Main line and gearing activation pressure are maintained throughout the entire system by components which are fluid pressure versus spring compression activated thus enabling the transmission to pick up the load gradually, without shock, which obviously reduces strain upon the entire system.

The oil flow throughout the transmission, other than basic lubrication, is controlled manually by the straight line shifting arrangement which has an integrated toothed rack which meshes with a pinion gear to activate the proper connections of the hydraulic servo-system through the operation of a rotary distributor valve. The rotary distributor valve directs pressurized oil flow to the correct fittings, those being the various brake bands and clutches. The valve itself contains four high pressure ports and is connected to and supplied from the variable pressure regulator by a major oil line. Therefore, once the hydraulic system has been activated by the engine shaft or prime mover at an idling speed, and once the operator has manually selected his desired gear causing the rotary distributor valve to connect the proper oil line, the transmission is ready for operation. When the engine shaft rotations are increased to a fast idle, causing the restriction of the oil flow through the variable pressure regulator to cease, which obviously allows full pressurized flow to all components, the unique set of epicyclic gears will be set in motion corresponding to the operations directed manually from the shift lever.

At operating speeds, that is those above idle, when main line pressure is within limits, a by-pass valve recirculates pump output to a sump. To maintain adequate mainline and operating pressure at operating speeds, a fluid pressure versus spring compression differential piston pressure regulator, sensitive to main line pressure, activates the by-pass valve to resupply an accumulator when pressure falls below a specified limit. The accumulator maintains a main line oil supply and thus provides adequate pressure to assure proper pressure through the rotary distributor valve to the gearing components to keep the transmission solidly in gear. Furthermore, the gearing control means, being the brake bands, are also designed to be activated and to operate on a fluid pressure versus spring compression principle to allow gradual activation of the gearing elements.

The actual gearing system is comprised of the aforementioned engine shaft, a rearwardly positioned load shaft and two planetary gearing sections consisting of three pinion sets each. More pinion sets per section may be incorporated and could result in further size and weight reduction, but the basic driving principles would remain the same. The forward section of the transmission further includes a dual-clutch system which yields the capability of transmitting engine torque through either the main shaft of the transmission, the rear planetary gear carrier, or through a dual-annulus gear, locked in step with the rear pinion carrier, to the load shaft. The dual clutch assembly is connected to the hydraulic system and is activated through an annular piston which, in effect, when in operation, causes torque to be transmitted from the drive clutch plates to the driven clutch plates. A unique fluid pressure versus spring compression separator to prevent disc slippage forms an integral part of the annular piston.

The forward pinion set and planetary gear set is further comprised of a brake band, an annulus gear, three pinion gear clusters, each consisting of two gears and a forward section of a dual-annulus gear. Between the rear pinion carrier and the dual-annulus gear, a sprag clutch is positioned, as is common to the art, to prevent the rear pinion carrier from reversing its direction when the dual annulus gear is in operation. The dual-annulus gear is further mounted upon the hub extension of the rear planetary carrier. The dual annulus may be restrained by the operation of the second brake band.

The rear planetary gear set consists of a third brake band, an annulus gear, and three pinion gear clusters, each comprised of three gears which act to interconnect the rear planet carrier and the load shaft. The dual annulus gear communicates with and serves as a link between the front and rear planet gear sets.

Briefly, the operation of the transmission gearing system is as follows:

In neutral, the rotary distributor valve is directed to allow no oil pressure to be applied to any elements which would cause the load shaft to rotate. The load shaft, therefore, remains stationary.

In reverse, the rear clutch is activated causing the rear pinion carrier to turn at engine speed. The rear brake band is applied and tightened thereby restraining the annulus gear and giving reactive force to the pinion gear cluster causing the load shaft to turn in the opposite direction of the rear pinion carrier and engine shaft.

In low or first gear, the rear clutch again activates the rear pinion carrier, but now the middle brake band is activated, restraining the dual annulus gear and causing one gear of the rear cluster to drive the load shaft forward, but at a greatly reduced speed as compared to that of the rear pinion carrier.

In second gear, no clutch action occurs. The forward brake band, restraining the forward annulus gear, is tightened causing the smaller of the forward planetary gears to drive the dual annulus forward but at a rate which, compared to that of the engine shaft, is reduced. While the dual annulus gear rotation is being increased in speed, the rear pinion carrier is slowing down and giving up its inertial energy to the load shaft. The sprag clutch thereafter comes into operation by locking the rear pinion carrier and dual annulus gear into step; thus the entire engaged assembly, including the load shaft, revolves as a unit, the reduction being that of the front pinion gear cluster.

In third gear the same combination of elements occurs as in second gear, plus the activation of the rear clutch, causing the rear pinion carrier to rotate at engine speed. This yields another increment of speed to the load shaft. It should be noted that in third gear the transmission has its least reduction while all gearing elements are in operation.

In fourth gear the forward clutch is activated to provide a direct connection between the engine shaft and the load shaft through the main transmission shaft, yielding direct drive.

The present invention provides a transmission having relatively small size, one having a relatively simple composition and interrelated operation, and one having a minimum of component parts. This results in ease of maintenance and economy in production and manufacture. The transmission is highly efficient and smooth in its operation which will result in savings of fuel and maintenance costs.

These features are a result of the uniquely integrated compensating fluid pressure versus spring compression controlled hydraulic servo-system which makes possible the use of all internal gear driven elements. In fact the transmission pinion gear clusters are characterized by the use of die cast gears. This in itself allows a marked reduction in manufacturing and related maintenance costs. Further features and advantages will be apparent from the accompanying drawings and description.

BRIEF DESCRIPTION OF THE DRAWINGS

FIG. 2 is an enlarged longitudinal section of a separator used in the clutches of the transmission of FIG. 1.

FIG. 5 further illustrates a top view of the shifter plate assembly of the shifting arrangement of FIG. 4.

FIG. 6 illustrates an enlarged view of the spring loaded ball and plate detent used to position the operating rack of FIG. 4.

FIG. 9 is a transverse section through the rotary distributor valve of FIG. 8.

FIG. 10 is a developed view of the outer surface of the spool of the rotary distributor valve of FIGS. 8 and 9.

DESCRIPTION OF THE DRAWINGS

Figure 1:
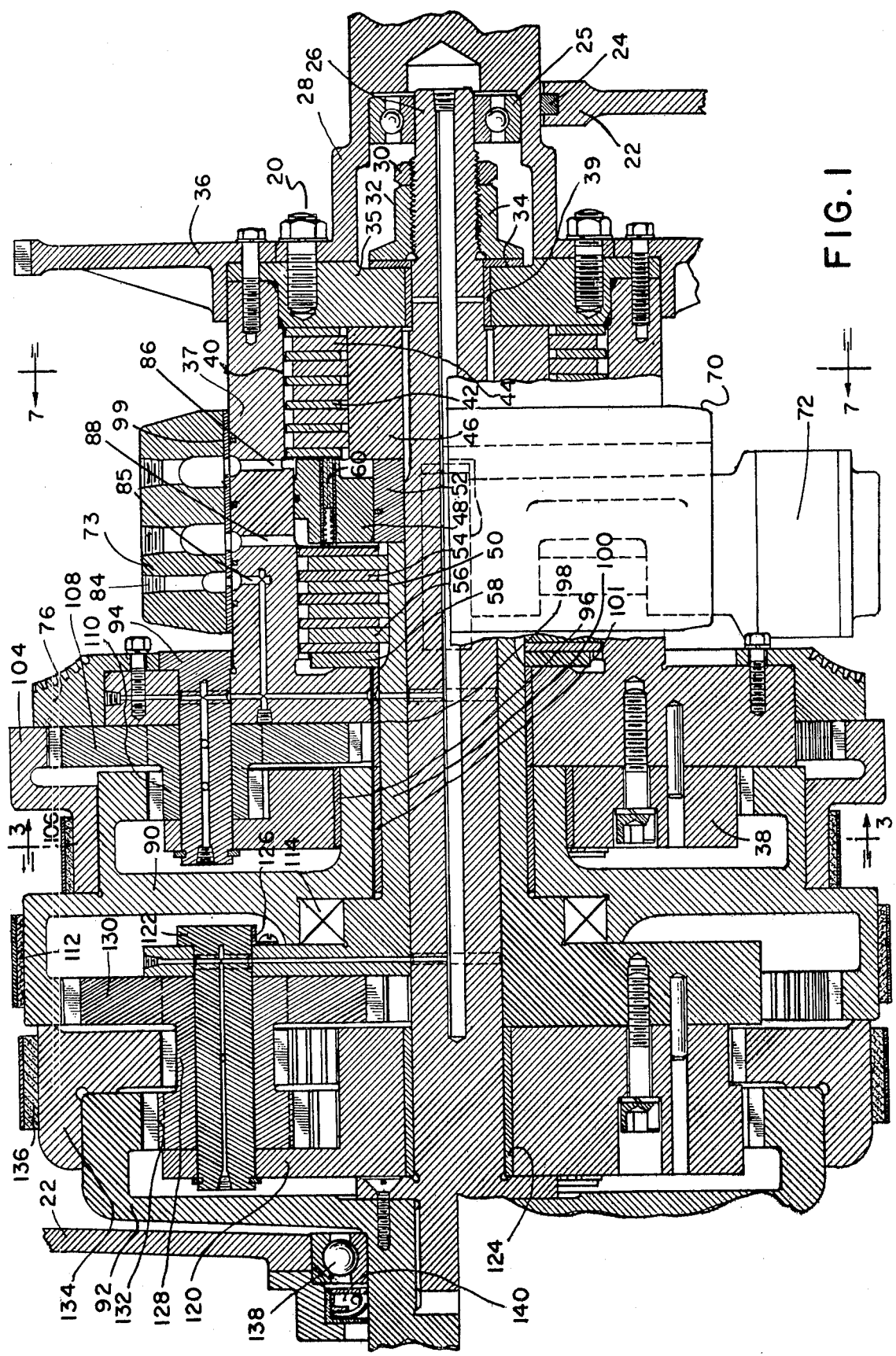
FIG. 1 is an elevation section of the operative mechanical elements of the transmission of the present invention.

Referring now to FIG. 1, an elevation view of the power transmission of the present invention is generally designated by reference numeral 20. Transmission 20 is supported within a casing 22 which is interconnected to the same by seal 24. Bearing 25 forms the front support for main transmission shaft 26. Main shaft 26 is surrounded and movably secured within transmission case 22 by lock nut 30 securing nut 32 which communicates with a spacer 34 which separates the same from clutch housing endplate 35. Starter gear 36 and variable speed prime mover drive shaft 28 circumscribe the aforementioned portion of transmission 20, starter gear 36 being affixed to clutch housing end plate 35 and to forward pinion carrier 38 and prime mover 28 being affixed to said one plate 35, causing the same to turn as a unit. Thus main shaft 26 may revolve unaffected by said prime mover 28. Bearing 39 further supports the front end of the integrated clutch housing 37 and pinion carrier 38.

Forward clutch, generally designated 40, contains drive plates 42 and driven plates 44. Forward clutch 40 circumscribes splined hub 46 I.D. and O.D., which circumscribes main shaft 26, and is capable of transmitting direct drive. Annular piston 48, positioned between forward clutch 40 and rear clutch 50, utilizes pressurized lubrication furnished to said clutches through lines and means to be later elaborated upon. Annular piston 48 rests upon a spacer 52 circumscribing main shaft 26. Rear clutch 50, being the larger of the two clutches and responsible for the operation of the rear portions of the transmission, consists of drive plates 54 and driven plates 56. Rear clutch 50 is separated from forward pinion carrier 38 by means of spacer 58.

In conjunction with clutches 40 and 50, reference is now made to FIG. 2 wherein there is illustrated one of the six separators 60 used, their operative ends positioned alternately, to prevent the possibility of a clutch disc slipping into an undercut.

Separator 60 consists of a spring-loaded free fitting plunger 62 which works within a closed end cylinder 64. Spring 65 communicates with closed cylinder end 66 and the interior end of plunger 62. Plunger 62 has a relief groove 67 on its side to allow plunger 62 to act as a balanced piston due to the fluid pressure being the same on each end of plunger 62. Operative plunger end 68 thereby maintains a constant, but light, pressure against the adjacent clutch drive plate. Three plungers are associated with the pressurized oil lines which activate forward clutch 40 and three are associated with oil lines which activate rear clutch 50 and are positioned alternately in annular piston 48.

Positioned and aligned with clutches 40, 50 and housing 37 is the pressurized oil lubrication system or hydraulic servo-system generally designated 70. The phantom lines of FIG. 1 designate the upper portion of the gear driven oil pump 72 and the machined flange faces of oil annulus 73 Submerged gear-type pump 72 is driven by two helical gears 76 and 78. Pump 72 draws oil from a filtration unit means in a sump (not illustrated) and discharges the same into the base of variable pressure regulator 80. Further included in the hydraulic servo-system, but not illustrated at this time, are a rotary distributor valve, a by-pass valve, a differential piston pressure regulator and an accumulator which, in combination, feed pressurized oil to oil annulus 73, fitting 84 and passage 85 of FIG. 1, which, in turn, furnishes pressurized lubrication to all vital locations of transmission 20. Passages 86 and 88 connect, as is illustrated, to annular piston 48 and communicate with its related separators 60 (six in number) in clutch housing 37 to supply oil for the operation of clutches 40 and 50 as directed by the rotary distributor valve.

The gearing arrangement is characterized by two sets of epicyclic gear trains which are interconnected for least reduction by a dual annulus gear 90. Torque is transmitted rearwardly to load shaft 92 which, at its center, is fixably connected to main shaft 26. The operating interrelations of the gearing elements are to be later discussed, but the spatial relations will be illustrated first.

Forward pinion carrier 38 including pinion shaft 94, is supported and separated from the hub extension of dual annulus 90 by bearing 96. Integrated carrier housing 38 and clutch housing 37, are mounted and separated from rear pinion carrier hub extension 100, which communicates with rear clutch 50, by bearing 98. Carrier 38 and clutch housing 37 are further separated from oil annulus 73 by bearing 99. Dual annulus gear hub 90 is supported by and separated from rear pinion shaft extension 100 by bearing 101.

Completing the forward gear set is annular gear 104 which is activated by band brake 106 which is directed by control means associated with the hydraulic servo-system. Gears 108 and 110 complete the forward pinion gear cluster, gear 110 communicating with forward extension of dual annulus 90.

Second band brake 112 controls dual annulus 90 and is also connected with control means of the hydraulic servo-system. A sprag clutch 114 is further situated between dual annulus 90 and rear pinion carrier 120 which, at the appropriate time, allows these two elements to be locked into step. The rear pinion shaft is designated 122. Numeral 126 designates a locator which assures proper placement of pinion shaft 122 during assembly. The rear pinion cluster includes three gears 128, 130, 132 which act in combination to transmit torque to load shaft 92. Rear annulus gear 134, revolving on load shaft 92, and meshing with the middle gear 128 of the cluster, is controlled by rear brake band 136 which is also connected with control means of the hydraulic servo-system. Rear pinion carrier 120 rests upon bearing 124. Load shaft 92 is supported by bearing 138. Reference numeral 140 generally designates the oil seal assembly for load shaft 92.

Figure 3:
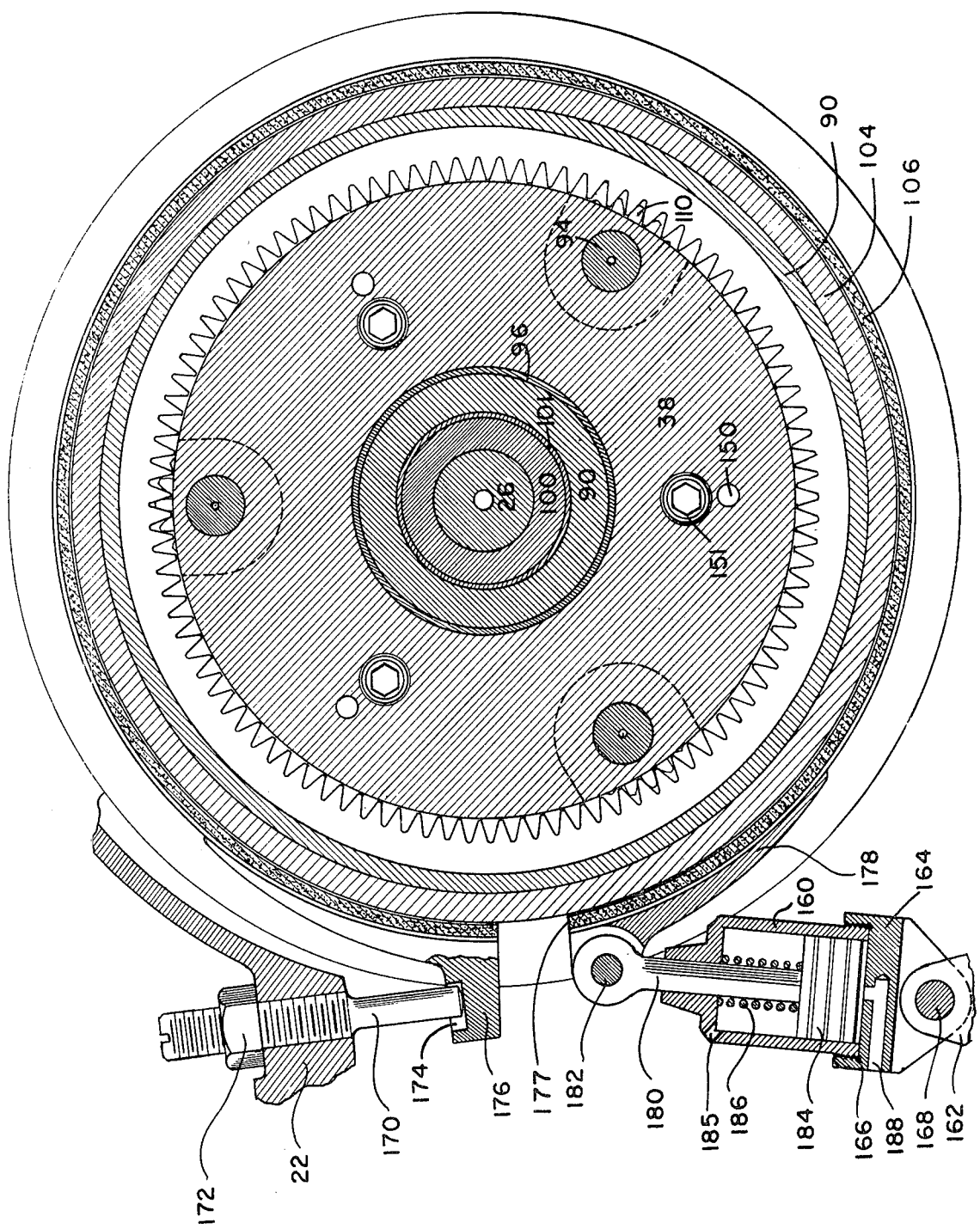
FIG. 3 is a transverse section illustrating the arrangement of a planetary gearing set including driving pinions and a clevis mounted hydraulic band brake of the present invention.

FIG. 3 illustrates the arrangement of driving pinion gear 110 and dual annulus 90 in combination with one of the band brakes 106, and one of the clevis mounted hydraulic cylinders, generally designated 160, used to activate band brakes 106, 112, 136. Three pinion sets are used for both the front and rear planetary units. More pinion sets could be used per section, which could result in size and weight reductions, but the basic driving principle would remain the same. With the gearing selected, the following ratios of engine speed to load shaft may be obtained: Reverse 4.167; first or low 2.631; second 1.584; third 1.295; fourth or direct drive 1:1.

Main shaft 26 is circumscribed by rear pinion carrier hub extension 100. Bearing 101 separates dual annulus 90 from rear pinion carrier hub extension 100. Bearing 96 separates the hub O.D. of dual annulus 90 from forward pinion carrier 38. Dowels 150 assure proper placement during assembly and in combination with capscrews 151 hold carrier 38 and clutch housing 37 in rigid alignment. Forward pinion shaft 94, supported by clutch housing 37, supports die cast gear 108 of the pinion gear cluster. Brake band 106 is wrapped around the hub of annulus gear 104. Brake band 106, as are all bands, is designed, as is common to the art, to not drag on the hub of annulus 104 when the external controls are released. The hub of annulus gear 104 further circumscribes the forward extension of dual annulus 90.

Pinion gear 110 of the cluster, which meshes with dual annulus gear 90 may be constructed from oil hardened and ground steel, its hub projection being used as a base for die cast gear 108. In the rear unit gears 130 and 132 are also die cast gears with pinion gear 128 hub projections serving as the base. Since the transmission uses internal gear drive exclusively and since there are three pinion gear clusters, therefore three pinion gears in each train, there are a minumum of six gear teeth carrying the load in each train at any one time resulting in very low tooth loading. Thus, this aspect makes feasible the use of die cast gears which yield a marked reduction in manufacturing costs.

The clevis mounted hydraulic cylinder, generally designated 160, which operates the brake bands, is mounted on a boss 162 of case 22, with base 164 of cylinder 160 screwed on against seal 166. Pin 168 is retained by a snap ring.

Brake anchor pin 170, having a locking nut 172, is adjustable in a complementary boss of case 22 and holds one end of brake band 106 by engaging notch 174 in upper fitting 176. Movable end 177 of band 106, being an integral part of attached lower clevis fitting 178, is fastened to cylinder piston rod 180 with pin 182 and thereafter suitabley secured. Piston 184, having a housing or casing cylinder 160, with a vent 185, is securely fastened to its driving piston rod 180 so that no movement of either is possible in relation to the other.

Figure 8:
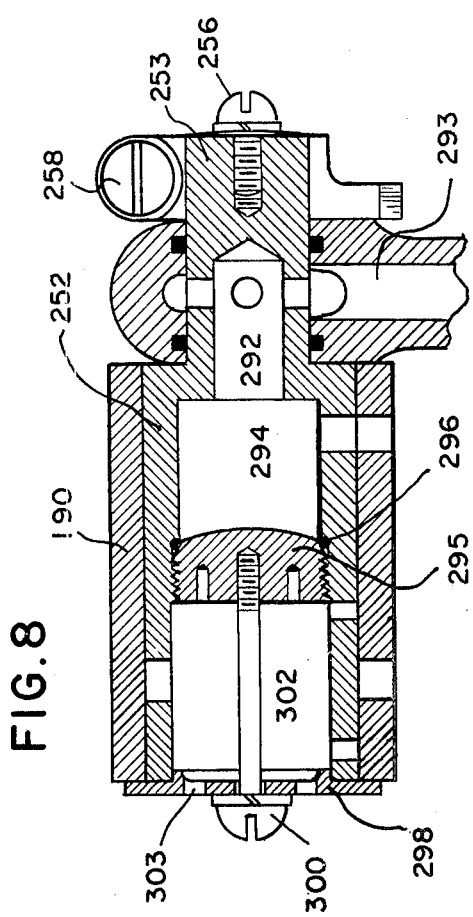
FIG. 8 illustrates the relations of the component parts of the rotary distributor valve of FIGS. 4 and 7.

Strong spring 186 forces fluid lubrication through line 188, which line also supplies pressurized lubrication to force the piston upwards and thereby activate the brake band, to drain the fluid to the rotary distributor valve of FIG. 8 when the pressure against piston 184 is cut off from said distributor valve. Strong spring 186, therefore, acts to compensate and reduce the force of entering high pressure fluid which acts upon the lower end of piston 184. This allows a gradual tightening of brake band 106 upon annulus gear 104 and creates a gradual restraint of annulus gear 104 which, in turn, reduces shock and stress upon internal elements during gearing changes.

Figure 4:
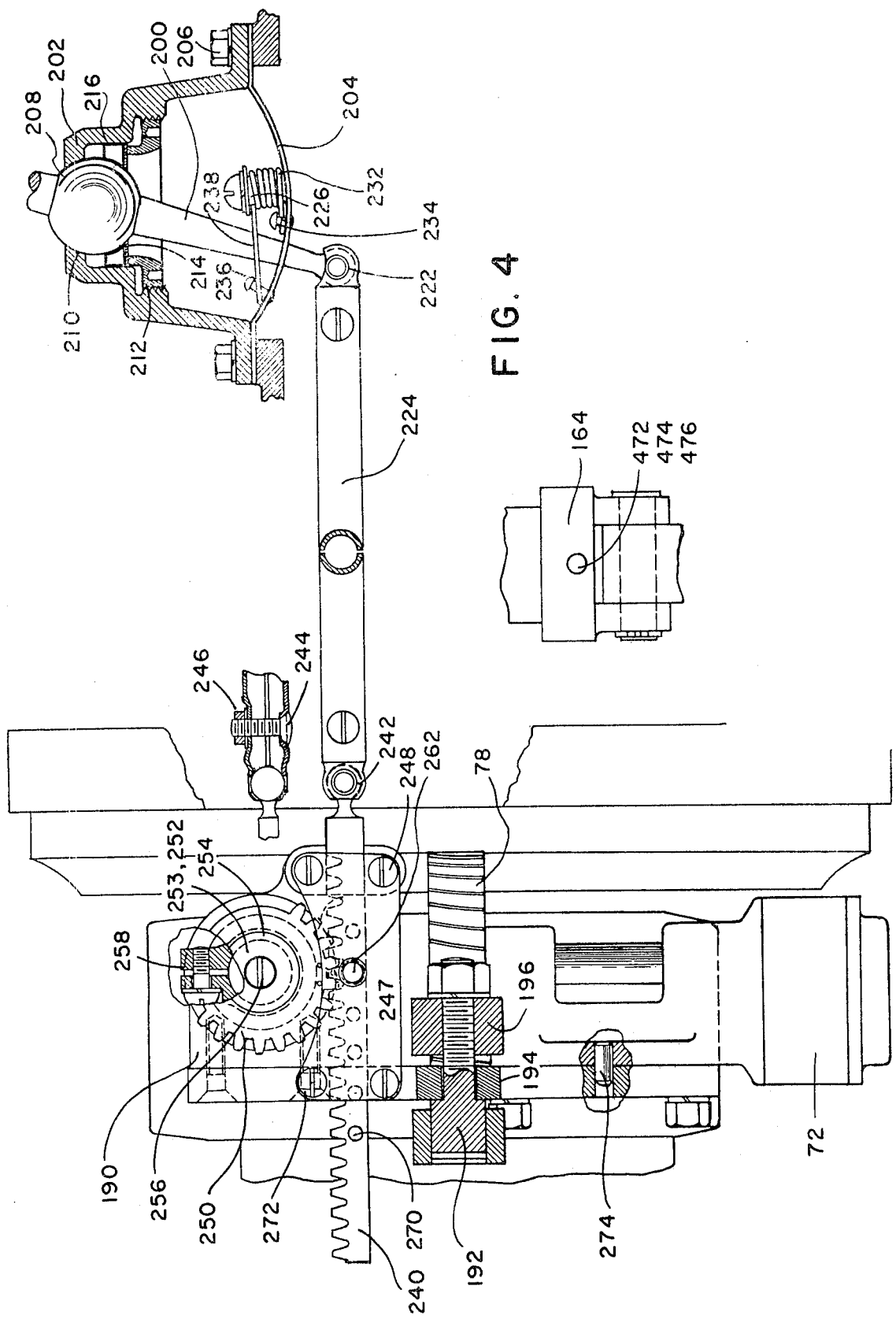
FIG. 4 is a side elevation view taken on FIG. 7 illustrating the operative manual control system including shifting arrangement, rack and pinion driven rotary distributor valve, and a view of adjustment features of the hydraulic pump drive gears of the hydraulic servo-system.

FIG. 4 illustrates a view of the shifting arrangement in combination with an end view of the rack and pinion driven rotary distributor valve 190. Transmission 20 is placed in operation by the action of prime mover 28 causing forward pinion carrier 38 to drive helical gears 76 and 78 of gear type pump 72 which, in turn, activates the hydraulic servo-system. in FIG. 4 only a portion of gear 78 is shown primarily to illustrate the adjustment of the backlash of gear 78. Proper backlash is obtained simply by adjusting screw 192 which is threaded into lug 196 and bears against a machined lug face of mounting flange 194 of oil annulus 73 of FIG. 1 and FIG. 4.

Referring now to FIG. 4, which illustrates a side view of the manually operated shifting arrangement, and referring to FIG. 5, which illustrates a top view of the shifter plate assembly, shift lever extension 200 is encased in housing 202 and extends downward through shifter plate 204 which is also secured to housing 202 by four capscrews 206. Shifter plate 204 is curved downward in a concave relation to a horizontal plane. Shift lever extension 200, threaded into a ball assembly 208 which is held against a spherical seat 210 in housing 202 by a threaded retainer 212, a flat washer 214, and a neoprene rubber seal 216. Shifter plate 204 (FIG. 5) includes longitudinally cut out portions 218 and 237 which allow movement of shift lever 200 forward and backward to direct the proper gearing arrangements. Shifter plate 204 has provisions, through means of a cut out portion, being aperture 220, in communication with forward end 221 of cut out portion 218, to allow downward ball end 222 which connects to linkage 224, to pass through when assembling and to allow movement to reverse position.

An internally threaded boss 226 is welded to plate 204. An appropriate screw 228 and washer 230 complement serve to locate spring coil 232. Button head rivet 234, positioned adjacent to threaded boss 226, restrains an extending end of spring coil 232, said end being partially looped around said rivet 234. Button head rivet 236 is aligned with said forward portion 221 of said longitudinal cut out portion 218 such that, due to the curvature of plate 204, the spring end extension 238 presses against rivet 236 and presses against lever extension 200 thus locking and restraining lever extension 200 in the desired neutral position, as illustrated due to spring end extension 238 being deformed in a slight curvature where it contacts lever extension 200. Sufficient pressure is maintained to keep lever extension 200 in this position, but not enough to prevent easy manual movement of said lever forward into reverse position as desired. In reverse position, shift lever extension 200 is moved forward in aperture 237 whereby spring tension will maintain lever extension 200 in postion due to spring extension pressure forcing lever extension 200 against end of slot in plate 204.

Referring now exclusively to FIG. 4, ball end 222 of lever extension 200 is appropriately secured to linkage 224 which is in turn secured similarly to rack 240 by ball end connection 242. These ball-end connections are secured by a bolt 224 and nut 246 which allows for movement of shift lever extension 200 in a straight line shifting arrangement which, in turn, allows for straight line movement of toothed rack 240.

Toothed rack 240 is meshed with pinion gear 250, operatively connected to rotary distributor valve 190, causing the proper and desired operation of the hydraulic servo-system which directs the operation of the epicyclic gearing to transmit torque to the load shaft. Operating rack 240 maintained in its position by plate 247 fastened to the machined faces of projecting flange of oil annulus 73 and cast arm of valve housing 190 by means of four screws collectively numbered 248.

To assemble this portion of transmission 20 and to set the proper alignment between rack 240 and pinion gear 250 of rotary distributor valve 190, of which only an end view is shown, the following procedure should be followed:

In FIG. 4, pinion gear 250 is positioned upon hub 253 of rotary core 252 of rotary distributor valve 190. Gear 250 is secured to hub 253 by retaining washer 254, hub screw 256, which screw further penetrates into hub 253, and clamping screw 258. Rack 240 is installed simultaneously. Gear 250 has two marked teeth between which a marked tooth of rack 240 is positioned. The teeth are marked simply for assembly to assure proper alignment so that, when in operation, neither element will overrun the other.

Spring-loaded ball and detente assembly 262 is attached. This assembly is best illustrated in FIG. 6. This assembly simply consists of a steel ball 264 within a cylinder 266 having a closed end 268. Open ball end has a plate 247 which is secured to distributor housing 190 and oil annulus flange 194 by screws (see FIG. 7). Ball 264 is simply forced into sockets 270 in rack 240 by spring to 271. This maintains rack 240 at the proper position for each gear and thus prevents unwanted movement.

To complete the assembly of this portion of transmission 20 and to set the proper alignment between rack 240, pinion gear 250 and rotary distributor valve core 252, the following procedure is advised. Locating pin 272 is inserted through the lowermost high pressure fitting of rotary distributor valve housing 190 and core 252, to be later illustrated, assuring proper alignment of these two elements. Shift lever 200 is placed in "reverse" position, that is, in aperture 237 of FIG. 5. This assures that interconnected linkage 224 and rack 240 will be positioned to their maximum forward extent to align said pinion gear 250 and rack 240. Pinion gear 250, thus, will be able to rotate in a counterclockwise direction to allow proper line connections of neutral through fourth gear as shift lever 200, linkage 224 and rack 240 are moved manually rearward. To secure this assembly, clamping screw 258 is tightened after screw 256 has been tightened into hub 253. Locating pin may thereafter be removed from the fitting so the proper fluid line may be attached. Dowel 274 allows oil pump 72, and its related gear to be rotated slightly to adjust helical gear tooth contact.

Figure 7:
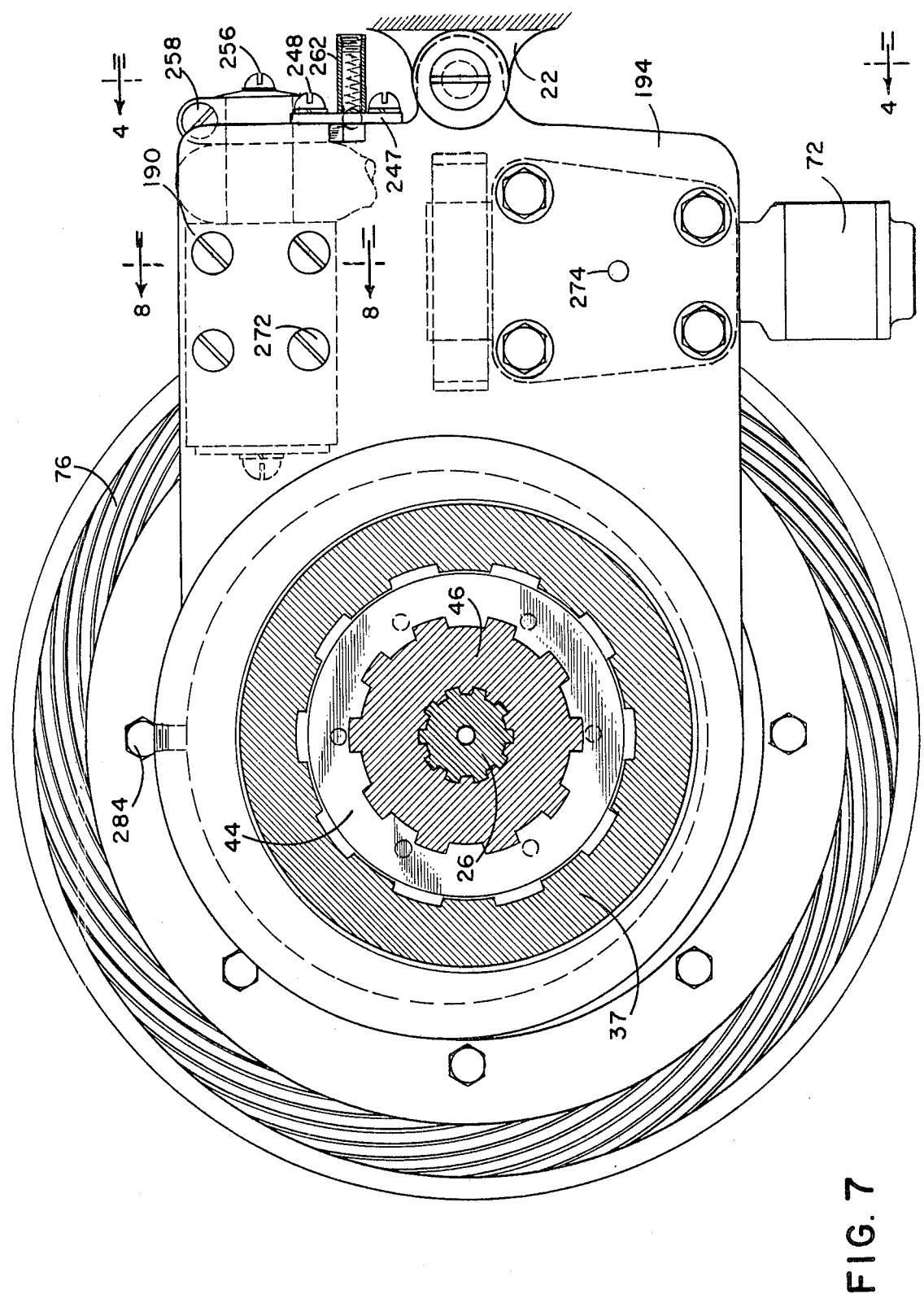
FIG. 7 is an transverse section, of FIG. 1, illustrating the helical gear driving arrangement for the submerged gear type pump in conjunction with components of the hydraulic servo-system of FIGS. 1 and 4.

FIG. 7 illustrates a transverse section of the helical gear driving arrangement for submerged gear type pump 72 taken along line 7—7 of FIG. 1. Also illustrated is the positioning of spring-loaded ball detente 262 of FIG. 6 which acts to maintain the meshed teeth of pinion gear 250 and rack 240 in proper alignment. Plate 247 and screws 248 are also illustrated in relation to rack 240 position. Also illustrated are the mounting means for the attachment of rotary distributor valve 190, which is secured to mounting plate 194 by four screws 272.

Helical gear 76, mounted on a flange of clutch housing 37, and retained by capscrews 284, is driven by the same receiving torque from prime mover 28. Helical gear 78 thereafter provides the driving force for pump 72 (FIG. 1).

FIG. 8 illustrates by a longitudinal section, components of rotary distributor valve 190. Housing 190 encases a core 252 (viewed singularly in FIG. 9) both of which contain lubrication pressure ports and drain ports capable of communicating through rotation of core 252. Hub screw 256 and clamping screw 258 securing pinion gear 250 to hub 253 of core 252, assure that core 252 will rotate with pinion gear 250 as directed from shift lever 200 through the straight line shifting arrangement (FIG. 4). As a result of core 252 rotation, appropriate high pressure core ports and drain ports will communicate with housing ports to activate the appropriate gearing relations for the operation of transmission 20.

Core 252 is cylindrical in shape. Hub 253 is characterized by its solid end around which pinion gear 250 is positioned and by its hollowed portion 292 which communicates with the hollowed portion of cylindrical core 252. Sealed fitting and connection 293, communicating with hollowed hub portion 292, transmits main line lubrication as governed by variable pressure regulator 80 through hub 253 to high pressure core chamber 294. This connection is a free fit but any axial movement is limited by clamping screw 258 on hub 253 of said core 252. Threaded plug 295 with O-ring 296 seals high pressure chamber 294. Ported end plate 298, secured to plug 295 by elongated screw 300, maintains the axial postion of rotary core 252 and provides drainage from drainage chamber 302 through ports 303 as needed. This drained oil is recirculated to a collecting sump in communication with oil pump 72.

FIG. 9 is a transverse view from the end of rotary distributor valve 190 illustrating high pressure chamber 294 of core 252 encased by housing 190. It will be noted that the exterior physical design of housing 190 is that of a horeseshoe or C-shape and parallels the shape of distributor pinion gear 250 and its related toothing arrangement. This embodiment allows easy attachment, as was illustrated in FIG. 7, to mounting plate 194.

Core 252 being cylindric in shape contains three large high pressure ports 310, 312, and 314 which lie in the same vertical plane. These ports provide the means to supply high pressure oil, at the appropriate time, to operate front clutch 40 or rear clutch 50 through two corresponding housing ports 316, 318. To illustrate, therefore, large core port 314 aligned with housing port 316 causes pressurized oil flow to activate rear clutch 50 through line 86 and annular piston 48. Illustrated in dotted outline is one small high pressure core port 320 which aligns with housing port 322, to supply high pressure oil to activate rear brake band 136, to supply housing port 324 to deliver high pressure oil to activate middle brake band 112, and to supply housing ports 326 and 328 to forward brake band 106. It should be noted that housing ports 326 and 328 are a dual feed to the same oil line, that being to forward band 106.

The distinctive features and specific operation of rotary distributor valve 190 will be elaborated upon when considering the total operation of transmission 20. At this point reference is made to Table 1 which illustrates the combinations of core ports and housing port connections occuring and the resultant gear ratios. It is simply important to note that core 252 is directed manually through the operation of gear lever linkage 224, rack 240 and pinion gear 250 which, in combination, cause rotation of core 252 counterclockwise in steps of thirty degrees to the remaining five operative positions.

FIG. 10 is a developed view of the outer surface of core 252 where it contacts housing 190 and should be viewed in conjunction with Table 1 and FIG. 9. The illustration of core 252 of FIG. 9 has been arbitrarily split at twelve o'clock to show the location of drain holes in addition to pressure holes. A mylar sketch of FIG. 11 placed over FIG. 10 will illustrate the various connections caused by the rotation of core 252 within housing 190, by moving the sketch in a right to left motion.

TABLE I

| Position Of Core | Clutch Core-Housing Port Connections | Brake Cylinder Core-Housing Port Connections | Brake Band Activated | Transmission Ratio |
|---|---|---|---|---|
| As Shown | 314–316 | 320–322 | 136 | Reverse |

TABLE I-continued

| Position Of Core | Clutch Core-Housing Port Connections | Brake Cylinder Core-Housing Port Connections | Brake Band Activated | Transmission Ratio |
| --- | --- | --- | --- | --- |
| 1st Step | none | none | none | Neutral |
| 2nd Step | 312-316 | 320-324 | 112 | First-Low |
| 3rd Step | none | 320-326 | 106 | Second |
| 4th Step | 310-316 | 320-328 | 106 | Third |
| 5th Step | 314-318 | none | none | Fourth-High |

Figure 11:
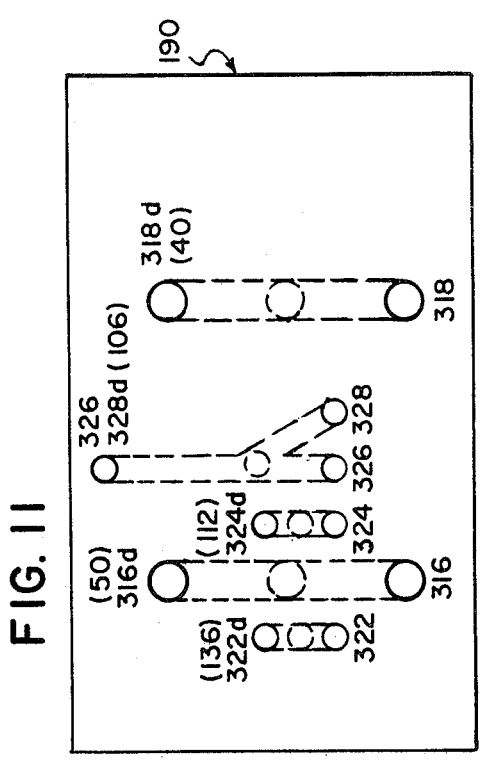
FIG. 11 is a developed view, taken along lines 8-8 of FIG. 8, of the inside of the rotary distributor valve housing of FIG. 8 illustrating feed and drain ports and a phantom view of related hose connections.

FIG. 11 illustrates a view from the inside of the housing 190 of FIG. 9 showing the location of pressure holes 316, 318, and 322-328, the drain holes marked with a corresponding small d, and a phantom view of the hose connections on the O.D. of housing 190. The same hose or line connections supply or drain operative elements. It should be noted in combination with the previous Figures that, unless a clutch element or power cylinder is supposed to be under pressure, it is connected to drain, thus precluding the possibility of any accidental or unwanted drag, that is, if a pressure port of core 252 is not supplying oil to a corresponding housing port line, clutch or power cylinder, a corresponding drain hole of core 252 communicates with housing drain ports to drain that element. Thus it will be observed that drain holes in the row A drain forward brake band 106; row B drains the oil supplied to activate forward clutch 40 and rear clutch 50; row C drain holes drain the oil supplied to the rear and middle brake bands 136 and 112. The drain holes are further numbered by R, N, 1, 2, 3 and 4 to further illustrate when they are open and connected with housing port drain holes numbered 316d, 318d, 322d-328d when transmission 20 is in operation. It should also be noted that in neutral all components are in the drain position and no high pressure ports are in communication.

Figure 12:
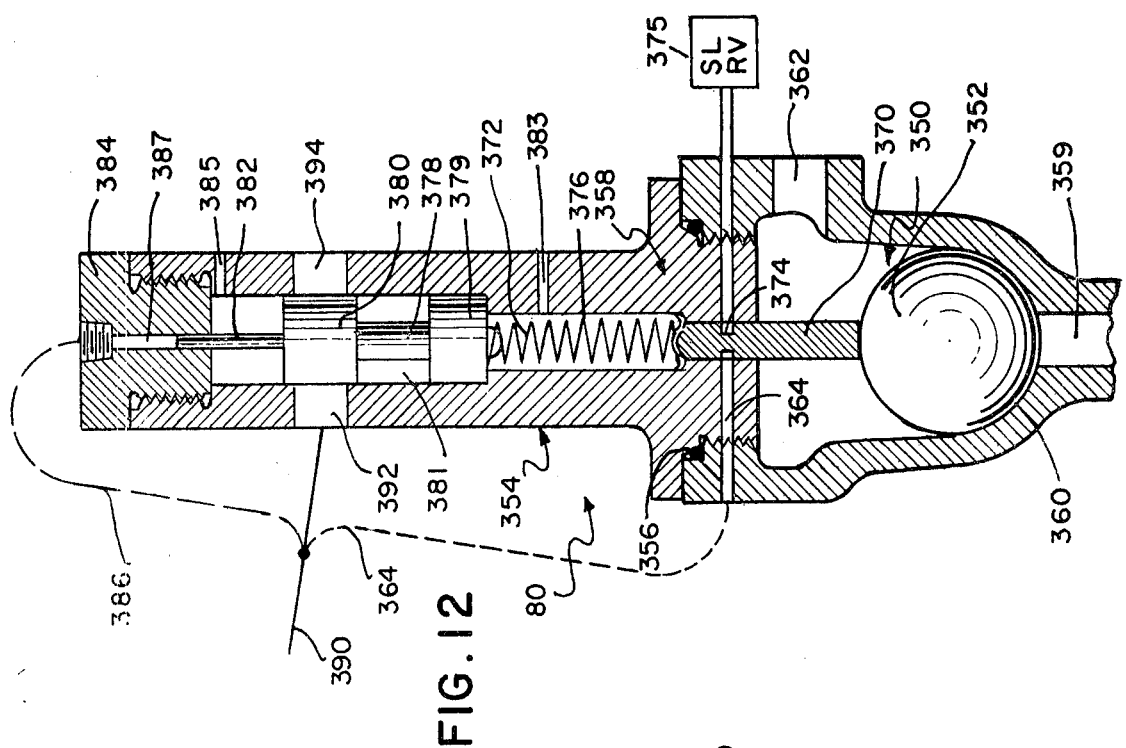
FIG. 12 is a longitudinal section, of the variable pressure regulator.

FIG. 12 illustrates a longitudinal section of variable pressure regulator 80, within the hydraulic servo-system, which initiates the ability of transmission 20 to pick up the load gradually, without shock, as with hydraulic coupling. Variable pressure regulator 80 may be divided into two major components including a lower hollowed chamber 350 which contains a ball 352. This portion is sensitive to oil flow discharge rates from pump 72. The upper section is a spring-loaded and actuated regulator valve 354, sensitive to variable fluid pressure, which directs pressure to rotary distributor valve fitting 293. Valve body 354 is screwed, as a threaded connector, against O-ring seal 356 thus sealing ball chamber 350 and forming an appropriate integrated housing 358. Fitting 359 at the base of and leading to chamber 350 receives oil from helical gear driven pump of FIG. 7. Chamber 350 is characterized by a spherical seat 360 upon which ball 352 may rest. The diameter of seat 360, at A—A of FIG. 13, in housing 358 is calculated to allow five percent of the maximum pump discharge to flow around ball 352 without appreciably changing the indicated position of ball 352 which, in effect, corresponds to a slow idle of the engine. As may be seen from the enlarged section, FIG. 13, the inner surface of chamber 350 is symmetrical about a vertical center line, the projection of any horizontal section being a true circle. The surface from Sec. A—A to Sec. B—B may be considered as the frustum of an inverted right circular cone, with its base at Sec. B—B. The diameter of the chamber at Sec. B—B is calculated to allow ten percent of the maximum pump discharge to flow around the ball 352, with its center at this position. This position corresponds to a "fast idle" of the engine.

The chamber I.D., from Sec. B—B to Sec. C—C, is uniform so only a minimal increase in engine speed will move ball 352 to Sec. C—C. The chamber, above Sec. C—C, has a pronounced outward taper which allows maximum pump discharge, without restriction, through port 362.

The threaded connection between chamber 350 and regulator valve 354 is further characterized by an oil line 364 through the housing threaded connection. Plunger 370 has one end in communication with the upper surface of ball 352, its other end extending through the housing 358 past oil line 364 to be in communication with spring 372 of spring-loaded regulator valve 354. When ball 352 is positioned at rest in spherical seat 360, plunger annular groove 374 acts to connect the two distinct portions of housing line 364. Line 364 extends to a spring-loaded relief valve 375 which limits pressure within line 364. Spring chamber 376 is defined at its lower extent by plunger 370 and at its upper extent by spool 378 and a mediately positioned vent 379. At an idling speed, ball 352 is at rest. With incremental increases in engine speed and pump oil flow, the compensating fluid pressure versus spring compression concepts of the present invention are placed into practice in the initiation of the hydraulic servo-system.

Spool 378, its two cylinderical components and connecting portion being treated as a unit, has end 379 and end 380. Spool chamber 381 is of larger diameter than spring chamber portion 376. Spool endface 379 therefore rests upon the upper extent of spring chamber 376. In communication with spool endface 380 is an upper plunger 382 which extends into a bore through threaded connecting cap 384. Immediately below cap 384 is spool chamber vent 385. Upper plunger 382 further communicates with oil line 386 supported and guided through reamed hole 387 in cap 384 said line connecting to main oil line 390 at the juncture of plunger line 364. At rest, spool end 380 acts to obstruct main line ports 392 and 394. the movement of ball 352 upwards causes the activation of spring-loaded regulator valve 354. At an idle speed, the pressure in pipe 390 to rotary distributor valve 190 is somewhat less than that dictated by spring-loaded relief valve 375 through plunger line 364. As pump volume pressure increases slightly, ball 352 forces plunger 370 upwards one-eighth inch and disconnects plunger line 364 from spring-loaded relief valve 375. Spring 372, being compressed incrementally against endface of spool 378, allows some main line pressure to pass from port 394 to port 392 to the juncture of lines 364, 390 and 386. This increase then acts through line 386, which is secured within threaded connector 384, against the small endface of upper plunger 382 which, as previously stated, is supported and guided by reamed hole 387. This action pushes spool 378 downward and closes port 390 until another increase in pressure of spring 372 occurs through the upward movement of ball 352.

Figure 13:
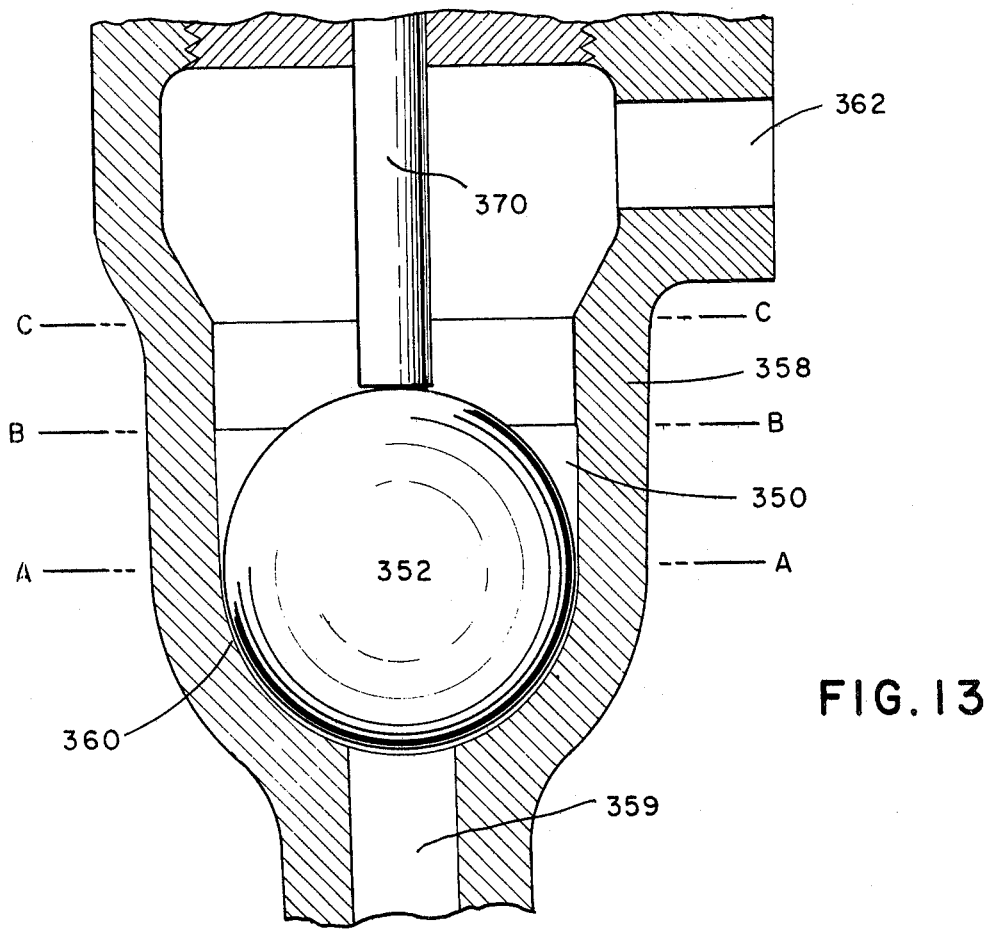
FIG. 13 is an enlarged view of the hollowed chamber of the variable pressure regulator of FIG. 12.

Therefore, at an idling speed, ball 352 allows a pump discharge of five precent of maximum flow without moving appreciably from its seated position. As pump flow increases, ball 352 moves upward in flow meter fashion, to plane B—B (FIG. 13). This position corresponds to a fast idle of the engine. Spring 372 has a calculated compressive strength such that, at a fast idle, the weights of plunger 382 and spool 378 plus the force of fluid pressure upon plunger 382 will form an equilibruim with said spring compression, and all elements will move as a unit. All this time, line 390 pressure to distributor valve 190 has been increasing gradually. Since line 390, which in turn directs pressurized lubrication to the gearing elements, is increasing, the resultant pressure upon the activation means of the gearing elements will be increasing gradually. Furthermore, especially due to the compensating pressure design of brake band control means, earlier described, the interaction of the gearing elements will increase gradually. Thus, this combination hydraulic servo-system allows for gradual initiation of the gearing elements and prohibits quick engagement of the gearing elements, which would produce shock. At a fast idle transmission 20 is in gear on a solid basis.

This cycle is repeated until the pressure of spring 372, at the half-inch upward position, ie. center of ball 352 at plane B of FIG. 13, becomes equal to line pressure 390 against upper plunger 382 through line 386. At this point, due to the uniform chamber bore from plane B—B to plane C—C of FIG. 13, a minimal increase in engine speed, causes all elements to move as a unit, and spool 378 fully opens port 392 to rotary distributor valve 190 through line 390. Variable pressure regulator 80 remains in this position until engine speed returns to idle.

Figure 14:
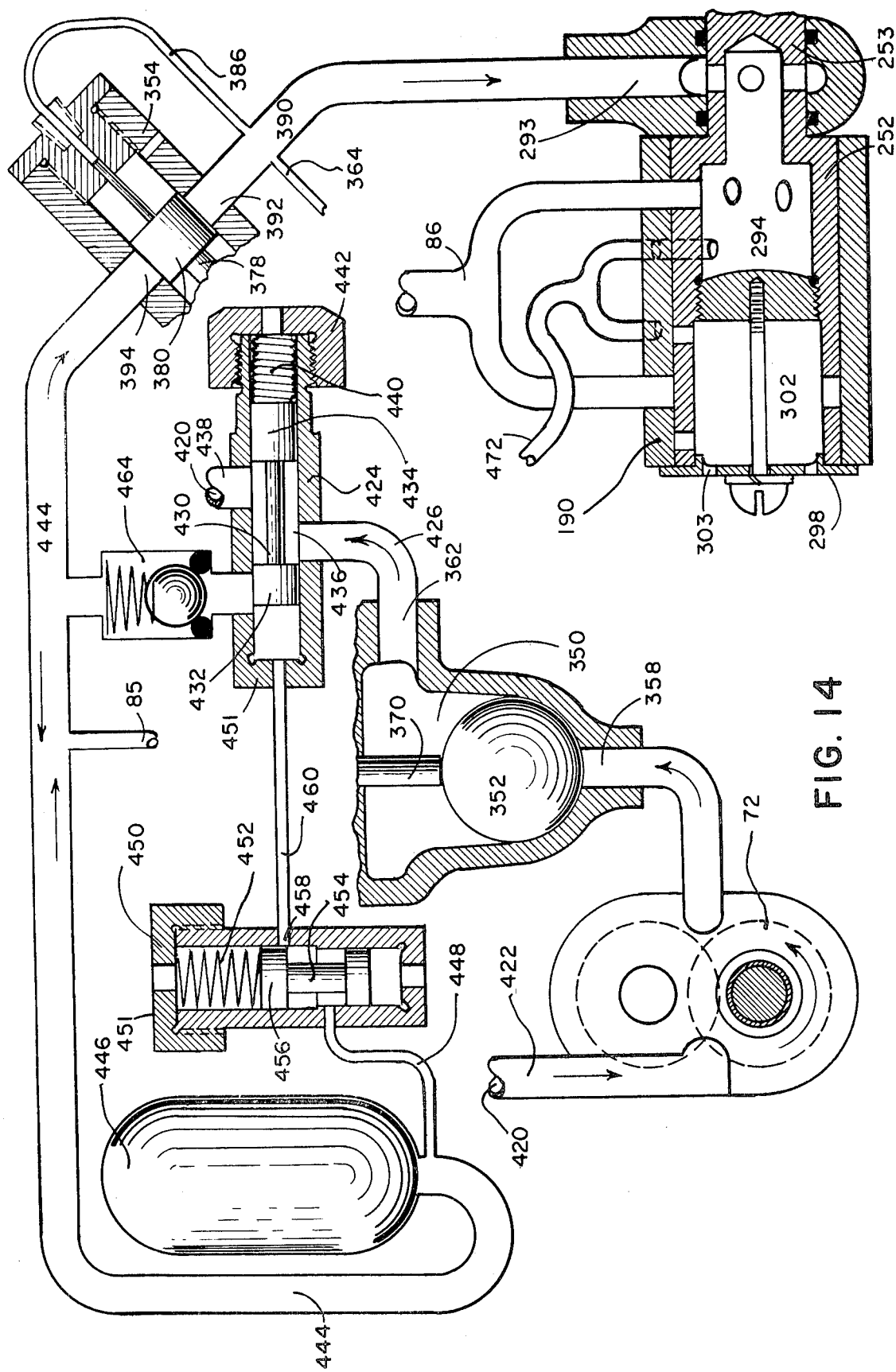
FIG. 14 is a flow pattern for the hydraulic servo-system of the transmission of FIG. 1 illustrating the relationship of the various components of FIGS. 4, 7, 8, 9 and 12.

Referring now to FIG. 14, the flow pattern, relation and operation of the essential elements of the hydraulic servo-system are illustrated, and in this instance, it will be assumed that transmission 20 is in reverse.

The view of the distributor valve is that of Section 8—8, of FIG. 9, except that it is looking in the opposite direction to the arrows to show the high pressure ports. FIG. 14 further illustrates the means to maintain oil pressure at desired operating levels so that, again, gear changes will be accomplished without shock due to said maintenance of adequate pressure.

Submerged gear-type pump 72 draws oil from some form of filtration unit in sump 420 through pipe 422. This oil is discharged to fitting 359 at the base of variable pressure regulator chamber 350 and is acted upon as described above in conjunction with FIGS. 12 and 13.

For the purposes of this figure we will assume that the engine speed, or that of variable prime mover 28, is in the operating range, that is a speed above fast idle. Thus ball 352 will be in the upper portion of chamber 350, above plane C, due to the oil flow into fitting 359, thus causing spool 378 to fully open port 392 to rotary distributor valve 190. Also as previously stated, the oil flow to distributor valve 190 causes the operation of the proper gearing relations, to be later discussed, due to the manual operation of shift lever 200.

The oil forced into chamber 350 passes through port 362 to by-pass valve body 424 through line 426 from whence it is redirected to sump 420. By-pass valve body 424 is comprised of a housing containing a spool 430 around which this oil flow passes. Spool ends 432 and 434 encase this flow area 436 which allows line 426 and line 438, to sump 420 to be positioned adjacent horizontally opposing each other. By-pass valve 424 further encases a spring 440 which is securely held in place against endface of spool 434 and by a threaded connecting nut 442, which is vented to sump 420.

Port 394 on spring-loaded regulator valve 354 opposite port 392 connects to main line 444 and an accumulator 446. High pressure line 448 connects at the juncture of accumulator 446 and main line 444 to, in turn, lead to differential piston pressure regulator 450 encased in a housing having a threaded vented cap 451, said piston having a spring 452 and a spool 454. Differential piston 454 and by-pass valve 424 both act upon a principle of compensating fluid versus spring compression pressures. Differential piston 454 is sensitive to main line 444 and accumulator 446 pressure whereby spring 452 has a compression relative to this pressure as hereinafter described. When main line and accumulator pressure is sufficient, oil pressure from line 448 acts upon differential piston 454 and spring 452, and causes spool end 456 to partially uncover port 458 leading to line 460, said pressure compressing spring 440 of by-pass valve 424. Thus by-pass valve 424 recirculates pump oil flow to sump 420.

When main line 444 and accumulator 446 combined pressures, acting against differential piston ie., spool 454, drops to the point where the pressure of spring 452 against endface 456 of spool 454 is sufficient to uncover port 458 to line 460, then by-pass spring 440, which has been fully compressed until now, quickly pushes spool 430 to the extreme left position exhausting the oil in line 460 through adjustable vented cap 451. Spool end 434 closes port outlet to sump 420 and forces gear pump 74 to discharge through spring-loaded ball check 464 to accumulator 446 through main line 444. As accumulator 446 pressure builds, spool 454 of differential piston regulator 450 rises against the action of spring 452 until port 458 to pipe 460 is again uncovered. High pressure oil, acting against endface 432 of by-pass spool 430 then fully compresses spring 440 and again recirculates pump oil flow to sump 420 until main pressure again falls and the cycle is repeated.

At this point all clutch and brake band connections have been made. While spring 440 is extended and oil is flowing through spring loaded ball check 464 to line 444 to fill accumulator 446, oil flowing to port 394 is directed past variable pressure regulator spool 378 to port 392 to juncture of lines 364, 386, and 390 and to rotary distributor valve 190, the operation of which has been previously described. Pressure from main line 444 is applied to furnish pressure lubrication to all vital points and locations through line 85 at fitting 84 on oil annulus 73. As a result of this combination, therefore, at speeds above fast idle, main line pressure is maintained to alleviate shock during gearing changes, and due to the interrelations of gearing changes to be hereinafter described, it will become evident that torque will be transmitted smoothly.

With rotary distributor valve core 252 in the postion shown by all previous figures, with the exception of FIG. 4, oil pressure is applied to passage 86 through rotary distributor valve core port 314 and housing port 316. This oil is then delivered to annuluar piston 48, and its related separators 60 of FIG. 1, to actuate rear clutch 50 causing torque to be transmitted from drive plates 54 to driven plates 56. This causes rear pinion carrier hub extension 100 and rear pinion carrier 120 to turn at engine speed or that of prime mover 28 as illustrated by FIG. 1. Similtaneously, pressure is applied through rotary distributor ports 320 and 322 and line 472 to actuate the power cylinder which tightens brake band 136 and restrains annulus gear 134. Pinion gear 128 of the rear pinion cluster is caused thereby to give reactive force to another member of the cluster, gear 132, which turns load shaft 92 in the opposite direction to that of rear pinion carrier 120. The transmission is now in reverse but only on a creeping basis at an idle speed. The engine must be up to fast idle before full line pressure is available for clutch and/or power cylinder operation.

In neutral, no pressure is applied to any of the elements due to the 30° rotation of distributor valve core 252 so there is no tendency for load shaft 92 to rotate in either direction. All connections are draining.

In low or first gear the same clutch and pinion carrier action takes place, as in reverse, that is, port 312 of rotary distributor valve core 252 connects with housing port 316 to passage 86 due to manual shifting action which has caused core 252 again to rotate 30°. Ports 320 and 324 are thus connected and therafter supply oil pressure to line 474 which causes middle brake band 112 to restrain dual-annulus 90. Gear 132 thus drives load shaft 92 forward but at a greatly reduced rate as compared to that of pinion carrier 120.

In second gear, manual straight line shifting again causes rotary distributor valve core 252 to rotate another increment of 30 degrees. Core port 320 aligns with housing port 326 and line 476 which tightens forward brake band 106 on the hub of annulus gear 104, restraining the same, which in turn causes forward pinion cluster gears 108 and 110 to drive dual annulus gear 90 forward, but at a reduced rate to that of prime mover 28. While dual annulus gear 90, which in first gear was motionless, is being increased in speed corresponding to the pinion ratios, rear pinion carrier 120 is slowing down, all the while giving up inertial energy to the load shaft 92. Since no clutch discs are engaged, there would normally be a tendency for rear pinion carrier 120 to slow to zero and then reverse its rotation with relation to dual annulus gear 90. This action is prevented by sprag clutch 114 which will not allow rear pinion carrier 120 to turn counterclockwise with respect to the hub of dual annulus gear 90, when viewed from the prime mover end of the transmission. Therefore, with the rear pinion carrier 120 locked in step with dual annulus gear 90, the torque passes directly through the entire assembly including the rear cluster, thereby adding another increment of speed to load shaft 92, the reduction being that of the forward pinion cluster since all elements turn as a unit.

In third gear, core 252 is further rotated 30 degrees aligning ports 320 and 328. As previously mentioned, fitting 328 is part of a dual feed to line 476 and forward brake band 106. Core port 310 is also aligned with housing port 316 which directs oil to annular piston 48 and activates rear clutch 50 and its related separators 60. This causes rear pinion carrier 120 to release its locked position and to rotate at the speed of the engine or prime mover 28 thus adding another increment of speed to load shaft 92.

In fourth gear, core 290 is further rotated, aligning ports 314 and 318 to direct oil to annular piston 48 and its related separators 60, and thereby actuating forward clutch 40. This provides a direct connection between prime mover 28 and main shaft 26 which is integrated with load shaft 92 yielding direct drive.

As previously noted, pinion gears 110, 128 could be made of oil hardened and ground steel with the hub projections used as a base for die case gears 108, 130 and 132. Since transmission 20 uses internal gear drive, exclusively, and since there are three pinion gears in each train there are a minimum of 6 gear teeth carrying the load in each train. This fact makes feasible the use of die cast gears which should effect a marked reduction in manufacturing costs.

The foregoing has described a manually directed step-gear transmission characterized by an integrated compensating fluid pressure versus spring compression hydraulic servo-system. It should be noted that the hydraulic servo-system could be incorporated into many transmissions now in existence. Such a system, therefore, undoubtedly is subject to varation, thus, the inventor does not wish to be strictly limited to specific components, as evidenced by the specification, due to variations which could be made without departing from the spirit of the invention as evidenced by the following claims.

I claim:

1. In hydraulic actuated epicyclically geared power transmissions having an engine input shaft and output load shaft, annulus gears with power cylinder and band control means and pinion gear clusters the combination comprising:
   a forward transmission section dual clutch unit and integrated forward pinion carrier and related gear clusters receiving driving power from said engine shaft;
   a main transmission shaft integrated with said load shaft and in communication with said dual clutch unit;
   a rearward transmission section pinion carrier including a shaft projection in communication with said dual clutch unit and having pinion gear cluster means in communication with said load shaft and annulus gear supported on said load shaft;
   a dual clutch unit capable of transmitting torque through said rear pinion carrier and said rear cluster to drive said load shaft;
   said rear pinion cluster capable of transferring torque from said rear pinion carrier and giving reactive force to said load shaft resulting in a reverse gear ratio and capable of transferring torque to cause said load shaft to turn the same direction as said rear pinion carrier but at a reduced speed relative to the speed of the engine shaft;
   a dual annulus gear in communication with said forward gear cluster and with said rear cluster to transmit torque from the forward transmission section to the rear section;
   means in communication with said rear carrier to lock said dual annulus and rear transmission carrier in step causing rotation as a unit at a reduced speed relative to the engine shaft, the reduction being in proportion to the ratio of said forward pinion cluster gears resulting in a second gear ratio;
   said dual clutch being capable of transmitting torque to said rear pinion carrier to unlock said forward and rear sections, resulting in a third gear ratio which is a higher ratio than said second gear ratio; and said dual clutch unit capable of transmitting torque through said main shaft to said load shaft causing direct drive;
   said power transmission gearing system having an hydraulic servo-system to activate the proper gearing combinations supplied by a pump and having a main oil line to supply a distribution valve to annulus gear power cylinder controls and dual clutch unit further comprising:

a compensating fluid pressure and spring compression variable pressure regulation means governing annulus control power cylinder by actuating fluid pressure at idling speeds by momentarily restricting oil flow to said distribution valve;

fluid pressure versus spring compression differential-piston regulator means sensitive to main line gear actuating pressure to maintain main line pressure within a desired operative range; and said variable pressure regulator providing a system of compensating fluid versus spring pressures to provide an operating pressure range at the distributor valve, as a linear function of pump discharge, of five to one hundred percent of main line pressure for the engine speed range of idle to fast idle thereby resulting in a gradual initiation of said gearing combinations and eliminating the need for a conventional clutch.

2. In the power transmission of claim 1 having hydraulically actuated annulus gear control power cylinder means and clutch units, a fluid pressure supply pump, a pump reservoir and a system of compensating fluid pressure versus spring compression means to activate annulus control power cylinder means in a pressure range of five to one hundred per cent of main line oil pressure to allow said transmission to be activated gradually further comprising a rotary distribution valve means to direct and drain pressurized lubrication to activate and deactivate said clutch units and annulus control power cylinders of said gearing system;

means to direct the operation of said rotary distributor valve;

a main line oil accumulator capable of providing a reservoir and supply of pressurized lubrication for said main line to said rotary distributor valve at operating speeds;

said variable pressure regulator controlling and restricting main line oil flow and pressure to said distribution valve at idling speeds;

said annulus control power cylinder means receiving said gradually increasing fluid pressure further having a piston and spring means to further resist increases in actuating fluid pressure and to complementarily allow gradual tightening of said control means as said fluid pressure increases, said spring causing said fluid to be exhausted upon deactivation;

a by-pass valve to selectively recirculate pump oil flow to said pump reservoir and to direct pump oil flow to said main line accumulator reservoir and thereby rebuild main line pressure as needed;

said differential-piston regulator means being sensitive to said main line and reservoir oil pressure and being capable of activating said by-pass valve to direct pump oil flow to supply said accumulator reservoir and said regulator being capable of deactivating said by-pass valve when main line pressure is sufficient, thereby causing pump oil flow to recirculate to said pump reservoir;

said variable pressure regulator allowing full main line pressure to said distributor valve above idling speeds; and said pump oil flow in communication with said main line flow only when said main line and accumulator pressure falls below specified levels needed to maintain the activation of gearing control means.

3. The hydraulic servo-system of claim 1 wherein said rotary distribution valve is directed by a manual straight line rack and pinion sector shifting arrangement.

4. In hydraulically actuated epicyclically geared transmissions, a system of compensating fluid pressure and spring compression regulation governing actuating fluid pressure to gearing combination control elements and clutches, at idling speeds, in combination with a system of fluid pressure versus spring compression regulation governing actuating fluid pressure at operating speeds, being capable of supplying a range of five to one hundred percent of main line pressure comprising;

pump means to supply oil pressure for said system;

a main oil lubrication line operatively connecting said system but distinct from and selectively supplied oil from said pump means:

an high pressure oil line from said main line providing lubrication means to all vital internal mechanical components and locations;

a distribution valve means to control the distribution of pressurized lubrication to said dual clutch system and to said epicyclic gearing control elements at the appropriate time as directed;

an accumulator connected on said main line providing a reserve supply of main line lubrication and pressure;

a variable pressure regulator valve means sensitive to and receiving said pump oil flow and capable, at idling speeds, of providing fluid pressure in a range of five to one hundred percent of main line pressure, as a linear function of said pump oil flow, due to compensating fluid pressure and spring compression, thereby resulting in a gradual increase in actuating fluid pressure to said gearing control elements;

a differential pressure regulator valve means responsive to main line pressure and capable of maintaining the same within desired limits at all speeds;

a by-pass valve means directing pump lubrication flow from said variable pressure regulator to recirculate to said pump means and also capable of directing pump flow to said accumulator reservoir via said main line;

said by-pass valve means to maintain adequate main line pressure, through said rotary distribution valve resulting in activation of said gearing control and clutch elements; and said epicyclic gearing members being activated gradually to eliminate shock and stress upon internal components and upon said engine.

5. The hydraulically actuated epicyclic gear transmission servo-system of claim 4, said transmission having a pinion carrier driven by an engine shaft whereby said oil pump is characterized by an helical-gear driving arrangement in combination with and receiving driving force from said pinion carrier.

6. The variable pressure regulation means of claim 4 governing actuating fluid pressure to said gearing elements and initiating said system of compensating pressures to allow said gearing elements to pick up load gradually without shock further comprising:

a lower hollowed chamber portion;

an upper spring-loaded fluid pressure balanced regulator valve having two main line valve ports, being positioned opposedly, communicating with said main line, one port leading to said accumulator and one port leading to said rotary distributor valve;

said chamber and said valve being integrated by means of each forming a threaded connection;

said chamber having a spherical seat;

a ball resting upon said spherical seat;

a port on the underside of said chamber to receive oil flow from said pump;

said chamber having a diameter at the center of its spherical seat only slightly larger than the diameter of said ball, such that 5 percent of said pump's rated discharge capacity can flow around said ball, at an idle speed, without appreciably changing the position of said seated ball, the diameter of said chamber becoming gradually larger for a distance, preferably one-half inch, along the vertical axis of said chamber, such that ten percent of said pump rated discharge capacity can flow around said ball after said flow has forced said ball to rise the aforementioned ½ inch in flowmeter fashion as the flow volume has increased, which corresponds to a fast idle; the chamber diameter becoming constant for a distance corresponding to the diameter of said main line valve ports, the diameter of said chamber thereafter having a pronounced outward taper, preferably for one-fourth inch to allow maximum pump discharge around said ball without restriction at operating speeds;

a discharge port in upper portion of chamber, communicating with said pronounced taper;

a plunger, in communication with the upper surface of said ball, extending through said threaded connection;

said threaded connection further having a bore lined up with matching holes of the same diameter in the lower chamber at assembly, to provide a clear connection between a variable-pressure oil line and a spring-loaded relief valve;

said plunger having an annular groove capable of communicating with said threaded connector oil line when said ball is seated;

a spring-loaded relief valve communicating with and limiting the pressure in said variable pressure oil line;

said spring-loaded regulator valve having a lower spring chamber portion and an upper spool chamber portion, said spool chamber having a larger diameter than said spring chamber portion, both portions being vented;

a spring within said spring chamber portion, in communication with the upper portion of said plunger through a formed washer;

a fluid pressure balanced spool, its lower end in communication with said spring and resting upon the upper extent of said spring;

an upper plunger communicating with the upper end of said spool;

a second variable pressure oil line communicating with said upper plunger and said main line commencing at said main line at connection of said first oil line;

a reamed bore cap threaded connector supporting and guiding said plunger and said second oil line in position in the upper portion of said regulator valve to maintain variable fluid pressure against the upper end of said plunger; and said spool being capable of restricting oil flow between said regulator ports by means of its upper end restricting said ports and capable of allowing oil flow as said spool moves upwards.

7. The hydraulic servo-system of claim 6 wherein said compensating fluid pressure and spring compression resulting in a gradual increase in pressure upon gear control elements, is initiated at an engine idling speed, the operation of said variable pressure regulator further including;

line pressure to said distributor valve being the same as that in both variable pressure threaded connection lines to said spring-loaded relief valve;

pump oil flow entering said chamber port and capable of exiting through said discharge port;

said regulator valve spool partially obstructing said main line ports at idling speeds;

said ball allowing a discharge of five percent of maximum pump discharge around itself without said flow appreciable moving said ball upwards;

said pump oil flow causing incremental increases in spring pressure as said ball moves upward, in flow meter fashion, causing lower plunger movement upwards and compression of said spring;

said plunger annular grooves being removed from communication with said threaded connector oil line thereby blocking said line to said spring-loaded relief valve;

said second oil line thereby capable of receiving increases in line pressure and transferring said pressure increases to exert downward force upon said upper plunger against said spool thereby providing compensating pressure resistance to upward movement of said plunger;

said spring having a calculated compressive strength such that at a fast idle, said ball having risen within said chamber, spring pressure exerted against the lower end of said spool will be counterbalanced by combined weights of said spool and upper plunger plus the force of said main line pressure exerted on said plunger through said second oil line to maintain said ball at this position, said components resulting in an equilibrium;

said second line compensating oil pressure being increased due to incremental upward movements of said spool caused by movement of said ball compressing said spring, the compressive strength of which is such that, at a fast idle, the upward force of the spring is exactly balanced by the combined weight of the spool plus the main line pressure on the upper plunger; and any further increases in engine speed resulting in increased pump oil flow will cause said ball, lower plunger, spring, spool and upper plunger to move upwards as a unit, thus fully opening said main line ports at operating speeds above fast idle;

said system of incrementally increasing compensating pressures cycle continues allowing gradual pressure increases to said gear control elements at idling speeds;

said ball thereafter forced to its upmost extent at operating speeds allowing maximum pump discharge and keeping said main line ports of said regulator valve open until engine speed drops to idle and said spool again restricts said ports.

8. The hydraulic servo-system of claim 4 having means to maintain mainline pressure in an operative range, at all speeds, and to supply and resupply lubrication to said main line and in particular to said accumulator when main line pressure drops to a minimum level, said servo-system operation further including the cycle of;

said by-pass valve means, receiving said pump flow from said discharge port of said variable pressure regulator, having the capability to recirculate oil flow to said sump or to deliver oil flow to said accumulator;

said by-pass valve having spring means counteracting fluid pressure;

said differential piston pressure regulator means, sensitive to and responsive to said main line accumulator pressure, controls pressurized oil flow which initiates said by-pass valve spring action;

oil line means operatively connecting said by-pass valve and said piston;

high pressure oil line means operatively connecting said accumulator main line and said differential piston pressure regulator means;

said differential piston having spool means operatively responsive to oil pressure from said accumulator capable of restricting or allowing transference of pressurized oil to said by-pass valve means;

said piston further having restrictive means, preferably a spring, operating against fluid pressurized movement of said spool means, providing an opposing force to said accumulator pressure, said spring being compressed between said spool end face and a vented cap of said valve housing;

said spring being compressed when main line and accumulator pressure acting on said piston is adequate;

said piston directing pressurized oil to said by-pass valve from said accumulator main line causing said by-pass valve spool to compress said spring and recirculate pump oil flow to said sump;

said piston spring extension acting to cause said piston to close said line to said by-pass valve as main line and accumulator pressure drops thereby maintaining fluid pressure and by-pass valve spring compression and pump oil flow recirculation;

said piston spring extension, as said main line pressure drops to a minimum operation level, has the capability causing said line to said by-pass valve to be opened to said vented piston cap, resulting in said by-pass spring forcing said by-pass spool to exhaust said oil past said piston spring to be exhausted through said vented cap;

said by-pass spool thereby cuts off recirculation to said sump and directs pump oil flow to said accumulator via said main line;

a spring-loaded ball check between said main line and said by-pass valve to prevent backflow;

said accumulator thereafter being filled, and related pressure regained, causes pressure against said piston and compression of said piston spring; and said accumulator pressure causes said line from said piston to said by-pass valve to be opened causing fluid pressure flow therethrough to said by-pass valve and compression of said by-pass spring thereby causing recirculation of pump oil flow.

9. The operation of said hydraulic servo-system of claim 4 wherein the maintenance of main line and accumulator pressure in an operative range is identical when said spool of said spring-loaded regulator valve obstructs said main line ports at an engine idle speed and when said regulator valve spool opens said main line ports at engine operating drive speeds.

10. The transmission of claim 4 having a rotary distributor valve operatively directing pressurized lubrication flow at proper times, as directed by shifting means, to said dual clutch unit and to said gear control elements the combination comprising:

an integrated ported housing having ports in a fixed position;

a cylindrical ported core communicating with and capable of axial rotation within said housing having a plurality of ports capable of communicating with said fixed housing ports;

an integrated core ported hub, ported to provide transference of lubrication from said hydraulic servo-system main line via said variable pressure regulator to said core, said hub being of a smaller diameter than the remainder of said core;

a forward core portion forming a high pressure chamber receiving oil from said ported hub;

a threaded plug communicating with the inner surface of said core defining said high pressure chamber;

means to seal said high pressure chamber;

a rearward ported end plate in communication with said housing;

a rearward drainage chamber defined by the area encompassed between said ported end plate and said threaded plug;

two large forward high pressure chamber housing ports being aligned in a vertical plane and being spaced 150° apart;

three large forward high pressure chamber core ports, aligned in the same vertical plane with said housing ports and capable of communicating therewith, one at a time, said core ports positioned 60° apart;

four small high pressure housing ports displaced horizontally and rearward to said large ports, one of said small ports 30° below said lower large port and 60° below, in a vertical plane from the first of the remaining three small ports which are 30° apart;

one small high pressure core port displaced horizontally from said larger core ports and aligned in a vertical plane with said small housing ports and capable of communicating therewith;

two vertically aligned small housing forward drainage chamber ports;

seven small core ports spaced and capable of communicating with said housing drainage ports;

two large mediately rearward positioned housing drainage ports;

eight large core drainage ports capable of communicating with said large housing drainage ports;

one rearward small housing drainage port;

four rearward core drainage ports capable of communicating with said rearward housing drainage port;

branched oil line means communicating with said housing ports such that the same line supplies and drains said individual gear control elements and clutches;

the arrangement of said ports being such that said core is capable of rotating in increments of 30° to make the appropriate clutch and gear element control connections in proper combinations to operate said gearing in the desired manner using at most two high pressure connections at a time, and such that core drain ports communicate with housing drain ports to drain all elements not receiving high pressure lubrication; and said high pressure ports being positioned such that all connections are made within a core rotation range of 150°.

11. The combination of housing and core ports of claim 10 wherein said forward large housing ports direct pressurized lubrication to said dual clutch unit and said mediately rearward positioned large housing ports drain said dual clutch unit;

said four forward small housing ports direct pressurized lubrication to annulus gear control elements, two ports directing pressurized lubrication to the same elements, and said rearward small housing ports drain said gear control elements;

said branched oil lines arranged in such a way that as pressure is applied to one set of control elements the pressure to any other control elements is simultaneously released, resulting in a smooth transference of torque;

12. The rotary distributor valve of claim 11 being revolved to its full extent clockwise and thereafter revolved in counter-clockwise movement operatively aligning said ports, the combination of ports providing directory lubrication flow through lines to power cylinder control elements, being an annulus gear means restrained by a brake band, and said dual clutch unit having a front and rear unit further including the steps of:

aligning said core small high pressure ports with the lowermost port of said small housing port vertical row thereby directing pressurized lubrication to rear annulus control means and simultaneously aligning the uppermost large high pressure core port with the lowermost large housing high pressure port directing pressurized lubrication to activate said rear clutch unit;

rotating said core 30°, whereby no port connections are made all elements having port drain connections;

rotating said core 30° thereby aligning said small core high pressure port with the second in a vertical row of housing high pressure ports directing pressurized lubrication to a second and mediately positioned annulus control means and simultaneously aligning said second large core high pressure port with said lower housing high pressure port directing pressurized lubrication to activate said rear clutch unit;

rotating said core another increment of 30° aligning said small core high pressure port with the third in a vertical row of high pressure housing ports directing pressurized lubrication to a forward annulus control means;

rotating said core again 30° aligning said small core high pressure port with the fourth in a vertical row of high pressure housing ports directing pressurized lubrication to said forward annulus control means and simultaneously aligning said lowermost large high pressure core port with said lowermost large high pressure housing port directing pressurized lubrication to activate said rear clutch unit;

rotating said spool a final 30° aligning said first and uppermost large core port with said uppermost and second large high pressure housing port directing pressurized lubrication to activate said front clutch unit;

said lines from said housing high pressure ports to said control means and said clutch units, being branched and connected to said housing drainage ports;

said spool drainage ports being so positioned as to align and communicate with said housing drainage ports and related oil lines, when such lines are not under pressure, thereby allowing said clutches and power cylinder control means to be drained accordingly; and the connections by means of lines to said dual clutch unit whereby said dual clutch has front and rear individual clutches and whereby said lowermost large housing port operatively connects to activate said rear clutch and whereby said uppermost large housing port operatively connects to activte said front clutch.

13. The rotary distributor valve of claim 4 controlling said gearing combinations through selective distribution of said high pressure oil by means of a manual straight line shifting arrangement, said shifting combination further including:

a pinion gear sector fixably secured around said core hub directing the rotation of said spool as directed from said straight line shifting arrangement;

a rack to mesh with said pinion gear sector, said rack and pinion gear sector arranged to translate straight line shifting movement into rotary movement;

said rack and pinion gear sector being aligned to allow said pinion gear sector a rotation of 150° in increments of 30° a spring loaded ball detent to hold rack and pinion gear in their desired position;

a location pin to set the proper alignment of said core port, housing and pinion gear sector to said rack during assembly;

means to secure said rotary distributor valve to said transmission;

linkage between said rack and said shift lever;

ball end connections between said linkage and said rack and between said linkage and said shift lever;

dowel means to allow proper alignment of said hydraulic pump drive gear teeth by rotating pump support slightly about said dowel means; and an adjusting screw to obtain proper backlash, the same bearing against the machined face of said oil annulus flange.

14. The straight line shifting arrangement of claim 12 having a shift lever and ball end connection to said linkage further including:

a curved shifter plate, the ball end portion of said shift lever entending therethrough;

a housing locating said shifter plate;

longitudinally cut out portions of said shifter plate allowing straight line movement of said shift lever;

provision by means of circular aperture communicating with said longitudinal cut out portion to allow assembly of said arrangement by allowing ball end to pass through without interference;

an internally threaded boss adjacent to said longitudinal cut out portion fixable secured to said plate;

a button-head rivet adjacent to said boss;

a button-head rivet at the front end of said cut out portion;

a coiled spring flexibly secured around said boss by means of a screw and washer complement, said rivets restraining the ends of said coil spring;

said spring having a curved portion to restrain said shift lever in neutral position at the front of said longitudinal cut out portion, and a slightly angled end to hold said lever in the reverse position; and a ball assembly at the lower end of said shift lever;

a spherical seat in said housing complementing said ball assembly;

a retainer washer and seal assembly means to maintain the position of said shift lever and prevent oil leakage;

said shift lever being in reverse when lower end is moved to its forward extent and in neutral through fourth as it is moved rearward along said longitudinal cut out portion in shifter plate.

15. The hydraulic servo-system of claim 12 in a manually controlled semi-automatic step-gear transmission, for the transmission of torque from the engine shaft to the load shaft including within a housing, a main transmission, shaft, a variable speed prime mover, a hydraulic servo-system a dual clutch embodiment, an epicyclic planetary gearing system including two pinion carriers and a load shaft integrated with said main shaft, the combination comprising:

said hydraulic servo-system means including a submerged gear-type pump supply means positioned and aligned adjacent to said forward dual clutch section to provide lubrication to all vital points of said transmission and incremental increases in lubrication to gearing activation means within said system through the use of fluid pressure versus spring compression activation means thereby allowing said engine to pick up the load gradually, without shock, thus resulting in geater efficiency with less stress on all operative components;

said dual clutch having a forward and rear unit;

a rear planetary gearing section and gear cluster including and having a planet pinion carrier, activated by means of said rear clutch unit, an annulus gear circumscribing said planet carrier, a small rearward die cast pinion gear, a larger forward die cast pinion gear and a smaller central pinion gear, positioned with respect to said pinion carrier;

said annulus gear revolving on said load shaft embodied such that said annulus gear is capable of being restrained by control means including a brake band, to give reactive force to said rearward die cast pinion gear through the middle pinion gear, transmitting torque to said load shaft by giving reactive force to said rear pinion gear causing said load shaft to rotate in a direction opposite that of said pinion carrier rotation, thereby resulting in reverse gear;

a middle planetary section distinguished by dual annulus gear, in communication with and circumscribing said forward die cast gear of said rear planetary gear cluster;

said dual annulus gear circumscribed on its outer periphery by control means including a brake band and being restrained in first gear;

a forward transmission section, rearward to and in communication with said hydraulic servo-system section and integrated with said dual clutch unit comprising a pinion carrier to also provide power activation means for said hydraulic servo-system in relation to said variable speed prime mover and said engine rotation speed;

a forward annulus gear;

a two gear cluster including a die cast pinion gear meshing with said annulus gear and a pinion gear meshing with said dual annulus;

said forward die cast gear capable of transmitting torque from said forward annulus gear through said dual annulus and said rear gear cluster to said load shaft;

a sprag clutch means communication with said rear pinion carrier shaft and said dual annulus capable of locking said middle and rear sections in step when said middle annulus is restrained, resulting in a second gear, the reduction being that of said forward pinion cluster;

said gearing and transmission system being constructed such that said rear pinion carrier may be activated through said clutch means to turn at engine speed, while said forward pinion cluster section remains in operation, resulting in an incremental increase in speed through said rearward pinion cluster to said load shaft, resulting in a third gear;

said gearing system being arranged such that the least gearing reduction occurs when all gearing components are in operation;

a fourth gear resulting from activation of forward clutch section, thereby linking the prime mover directly to the main transmission shaft;

said gearing relation being controlled by a manual straight line shifting arrangement;

said clutches being actuated by an annular piston; and said power cylinder annulus control means being further gradually activated by fluid pressure versus spring compression.

* * * * *